(12) United States Patent
Schwartz et al.

(10) Patent No.: US 6,500,492 B1
(45) Date of Patent: Dec. 31, 2002

(54) AQUEOUS, FILM FORMING PREPARATIONS FOR COATING MINERAL SHAPED BODIES

(75) Inventors: Manfred Schwartz, Frankenthal (DE); Bertold Bechert, Grünstadt (DE); Harm Wiese, Heidelberg (DE); Wolfgang Hümmer, Birkenheide (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/787,895

(22) PCT Filed: Oct. 5, 1999

(86) PCT No.: PCT/EP99/07439

§ 371 (c)(1), (2), (4) Date: Mar. 28, 2001

(87) PCT Pub. No.: WO00/20355

PCT Pub. Date: Apr. 13, 2000

(30) Foreign Application Priority Data

Oct. 6, 1998 (DE) .......................................... 198 45 999

(51) Int. Cl.$^7$ .......................... B32B 13/00; B32B 9/00; B05D 7/00; C08L 33/04; C08L 35/00

(52) U.S. Cl. .............................. 427/407.1; 427/393.6; 428/688; 524/804; 524/806; 524/831; 524/833

(58) Field of Search ................................ 524/804, 806, 524/831, 833; 427/393.6, 407.1; 428/688

(56) References Cited

U.S. PATENT DOCUMENTS

| | | | |
|---|---|---|---|
| 3,219,610 A | 11/1965 | Tillson | |
| 5,070,136 A | 12/1991 | Dersch et al. | |
| 5,225,460 A | * 7/1993 | Sampath et al. | |
| 2001/0000232 A1 | 4/2001 | Zhao et al. | |

FOREIGN PATENT DOCUMENTS

| | | |
|---|---|---|
| CA | 2046215 | 1/1992 |
| DE | 21 64 256 | 6/1973 |
| DE | 39 18 981 | 12/1990 |
| DE | 195 14 266 | 10/1996 |
| DE | 197 49 642 | 5/1999 |
| DE | 198 10 050 | 9/1999 |
| EP | 279 067 | 8/1988 |
| EP | 0 297 781 | 1/1989 |
| EP | 469 295 | 2/1992 |
| GB | 1 411 268 | 10/1975 |
| WO | WO 96/32429 | 10/1996 |

* cited by examiner

*Primary Examiner*—Tae H. Yoon
(74) *Attorney, Agent, or Firm*—Oblon, Spivak, McClelland, Maier & Neustadt, P.C.

(57) ABSTRACT

The present invention provides for the use of film-forming aqueous formulations comprising in dispersed form at least one crosslinked copolymer P for coating shaped mineral articles and for a method of coating shaped mineral articles, said copolymer P comprising in copolymerized form a) from 80 to 99.89% by weight of at least one monomer selected from esters of acrylic acid with $C_1$–$C_{12}$-alkanols, esters of methacrylic acid with $C_1$–$C_8$-alkanols, and monovinylaromatics, b) from 0.1 to 19.99% by weight of at least one monomer different from a), and c) from 0.01 to 1.9% by weight of at least one crosslinking monomer selected from esters of acrylic or methacrylic acid with linear or branched $C_3$–$C_6$-alkenols, cyclic $C_5$–$C_7$-alkenols and polycyclic $C_2$–$C_{12}$-alkenols.

9 Claims, No Drawings

AQUEOUS, FILM FORMING PREPARATIONS FOR COATING MINERAL SHAPED BODIES

The present invention relates to the use of aqueous film-forming formulations comprising at least one crosslinked copolymer P in dispersed form for coating shaped mineral articles and to a process for coating shaped mineral articles.

By shaped mineral articles are meant, here and below, shaped articles which comprise mineral aggregates, such as sand, clay, crushed rock, etc., and a mineral binder, and also, if desired, customary additives. Mineral binders are common knowledge. They comprise, for example, finely divided inorganic substances, such as lime, gypsum, clay and/or cement, which can be shaped in the wet state and which, when left to themselves, harden after a certain time, either in air or underwater, with or without the action of elevated temperature, to give a stonelike mass.

The aggregates consist in general of granular or fibrous, natural or synthetic stone (gravel, sand, mineral fibers), including in special cases metals as well, or organic material or mixtures of said aggregates, with grain sizes or fiber lengths that are adapted in a conventional manner to the specific application intended. In many cases, color pigments are also used as aggregates, for the purpose of coloring.

Examples of shaped mineral articles that can be coated in accordance with the invention are concrete pipes, as used to transport waste water, for example, concrete roof tiles or curb stones, steps, base slabs, and plinth tiles based on mineral binders, and also fiber cement slabs, i.e. flat shaped mineral articles which may be filled with inorganic or organic fibers, such as polyester fibers or nylon fibers, for example.

A disadvantage of shaped mineral articles is that under the influence of weathering (especially exposure to water) the cationic constituents, such as $Ca^{2+}$, are leached out over the course of time, reducing the strength of the articles. This is often accompanied by efflorescence phenomena. These are probably attributable to the fact that cations with a valency of two or more, such as $Ca^{2+}$, react with the carbon dioxide from the air and so form, on the surface of the shaped mineral articles, white spots of lime. Efflorescence may also appear during the hardening of freshly prepared shaped mineral articles.

In order to avoid these disadvantages, the shaped mineral articles are often provided with a protective coat. For this purpose use is now generally made of aqueous coating systems whose film-forming constituent (binder) comprises an aqueous polymer dispersion. Customary binders include styrene-acrylate copolymers, vinyl acetate homo- and copolymers, pure acrylates and the like (cf. for example DE 21 64 256). However, the coatings obtainable with these binders are unable to prevent satisfactorily the emergence of the cationic constituents (efflorescence). Furthermore, such coatings are easily soiled.

It has proven possible to improve the protection of shaped mineral articles from the efflorescence described above by means, inter alia, of coating compositions based on styrene-acrylate dispersions or all-acrylate dispersions of EP-A-469 295 and DE-A-195 14 266. EP-A-469 295 recommends for this purpose the use of a specific anionic emulsifier, and DE-A-195 14 266 the use of polymers whose incorporated monomers include specific, sulfonate-functional monomers, while DE 197 49 642.3 recommends using polymers containing itaconic acid in copolymerized form.

EP-A-279 067 discloses clear varnishes for coating wood which comprise alkyl methacrylate-based polymers crosslinked with divinylaromatics, diol di(meth)acrylates or diallyl phthalates. On weathering, such coatings lose their gloss and become brittle over time. DE-198 10 050.7 discloses the use of aqueous, film-forming formulations based on alkyl methacrylate copolymers which contain not more than 1% by weight of monomers having two or more ethylenically unsaturated double bonds. There is no mention whatsoever of suitable polyunsaturated monomers, and the examples are devoid of polyethylenically unsaturated monomers.

It is an object of the present invention to provide coatings for shaped mineral articles which feature improved gloss stability and long-term durability in outdoor use, provide effective protection against efflorescence, and show good adhesion properties to mineral substrates.

We have found that this object is achieved and that aqueous formulations comprising copolymers P as film-forming constituent, which are composed essentially of (meth)acrylates and/or vinylaromatics and include from 0.01 to 1.9% by weight of specific diethylenically unsaturated (meth)acrylates having a crosslinking action result in coatings of increased gloss stability, high long-term durability, and good adhesion properties in outdoor use.

The present invention therefore provides for the use of aqueous film-forming formulations comprising in dispersed form at least one copolymer P composed of ethylenically unsaturated monomers, said copolymer P comprising in copolymerized form a) from 80 to 99.89% by weight of at least one monomer selected from esters of acrylic acid with $C_1$–$C_{12}$-alkanols, esters of methacrylic acid with $C_1$–$C_8$-alkanols and monovinylaromatics, b) from 0.1 to 19.99% by weight of at least one monomer different from a), selected from α,β-ethylenically unsaturated $C_3$–$C_6$ monocarboxylic and dicarboxylic acids, the amides, N-alkyl amides and nitriles of these carboxylic acids, monoesters of α,β-monoethylenically unsaturated $C_4$–$C_8$ dicarboxylic acids with $C_1$–$C_{12}$-alkanols, vinyl esters of aliphatic $C_1$–$C_{18}$ carboxylic acids, α,β-monoethylenically unsaturated sulfonic acids and sulfonic esters, and α,β-monoethylenically unsaturated siloxanes, and c) from 0.01 to 1.9% by weight of at least one crosslinking monomer selected from esters of acrylic or methacrylic acid with linear or branched $C_3$–$C_6$-alkenols, cyclic $C_5$–$C_7$-alkenols and polycyclic $C_7$- to $C_{12}$-alkenols, the total content of monomers bearing free acid groups, based on the total amount of all copolymerized monomers, being less than 5% by weight, for coating shaped mineral articles.

Examples of suitable esters of acrylic acid with $C_1$–$C_{12}$-alkanols are methyl, ethyl, n-propyl, isopropyl, n-butyl, 2-butyl, isobutyl, tert-butyl-, 1-methylbutyl, 2-methylbutyl, 3-methylbutyl, 1,1-dimethylbutyl, 2,2-dimethylbutyl, n-pentyl, 1-methylpentyl, 2-methylpentyl, 2-ethylpentyl, n-hexyl, 1-methylhexyl, 2-methylhexyl, 2-ethylhexyl, n-heptyl, 1-methylheptyl, 2-methylheptyl, 2-propylheptyl, n-octyl, 1-methyloctyl, 2-methyloctyl, n-decyl and n-dodecyl acrylate. Preference is given to the esters of acrylic acid with alkanols having 2 to 8 carbon atoms, i.e., ethyl, n-propyl, isopropyl, n-butyl, tert-butyl, n-pentyl, n-hexyl and 2-ethylhexyl acrylate. Of these, n-butyl acrylate and 2-ethylhexyl acrylate are particularly preferred.

Examples of suitable esters of methacrylic acid with $C_1$–$C_{18}$-alkanols are methyl, ethyl, n-propyl, isopropyl, n-butyl-, 2-butyl, isobutyl, tert-butyl, 1-methylbutyl, 2-methylbutyl, 3-methylbutyl, 1,1-dimethylbutyl, 2,2-dimethylbutyl, n-pentyl, 1-methylpentyl, 2-methylpentyl, 2-ethylpentyl, n-hexyl, 1-methylhexyl, 2-methylhexyl, 2-ethylhexyl, n-heptyl, 1-methylheptyl, 2-methylheptyl and n-octyl methacrylate. Preference is given to the esters of methacrylic acid with alkanols having 1 to 4 carbon atoms, i.e., methyl, ethyl, n-propyl, isopropyl, n-butyl and tert-butyl methacrylate. Of these, methyl methacrylate and n-butyl methacrylate are particularly preferred.

Examples of suitable vinylaromatic monomers are styrene, α-methylstyrene, o-chlorostyrene and vinyltoluene; styrene is preferred.

Based on the total monomer amount, the copolymers P contain preferably from 90 to 98.99% by weight and, with particular preference, from 95 to 98.49% by weight of the abovementioned monomers (monomers a)) in copolymerized form.

In addition to the abovementioned monomers, the copolymers P include, based on the total monomer amount, from 0.1 to 19.99% by weight, preferably from 1.0 to 9.9% by weight and, with particular preference, from 1.5 to 4.99% by weight of at least one different monomer (monomer b)) selected from α,β-ethylenically unsaturated $C_3$–$C_6$ monocarboxylic acids, such as acrylic acid, methacrylic acid, crotonic acid, vinylacetic acid, acrylamidoglycolic acid and methacrylamidoglycolic acid, α,β-monoethylenically unsaturated $C_4$–$C_6$ dicarboxylic acids, such as maleic acid, fumaric acid, itaconic acid and citraconic acid, the amides of the abovementioned unsaturated mono- and dicarboxylic acids, especially acrylamide and methacrylamide, the N-alkyl amides of the abovementioned unsaturated mono- and dicarboxylic acids and the nitriles of the abovementioned unsaturated mono- and dicarboxylic acids, such as acrylonitrile and methacrylonitrile, vinyl esters of aliphatic $C_1$–$C_{18}$ carboxylic acids, such as vinyl acetate, vinyl propionate, vinyl butyrate, vinyl valerate, vinyl hexanoate, vinyl 2-ethylhexanoate, vinyl decanoate, vinyl pivalate, vinyl laurate, vinyl stearate, and commercial monomers VEOVA® 5-11 (VEOVA® X is a tradename of Shell and stands for vinyl esters of α-branched aliphatic carboxylic acids having x carbon atoms, which are also known as Versatic® X acids), monoesters of α,β-monoethylenically unsaturated $C_4$–$C_8$-dicarboxylic acids with $C_1$–$C_{12}$-alkanols, such as monomethyl maleate and mono-n-butyl maleate, α,β-monoethylenically unsaturated sulfonic acids, such as vinylsulfonic acid, 2-acrylamido-2-methylpropanesulfonic acid, 2-acryloxyethanesulfonic acid and 2-methacryloxyethanesulfonic acid, 3-acryloxy- and 3-methacryloxypropanesulfonic acid and vinylbenzenesulfonic acid and the methyl, ethyl and n-butyl esters thereof, and α,β-monoethylenically unsaturated siloxanes, such as vinyltrialkoxy silanes, e.g., vinyltrimethoxysilane, alkylvinyldialkoxysilanes or (meth)acryloxyalkyltrialkoxysilanes, e.g., (meth)acryloxyethyltrimethoxysilane, (meth)acryloxypropyltrimethoxysilane. If the copolymers P include α,β-monoethylenically unsaturated siloxanes, they are generally used in amounts of up to 1% by weight, preferably from 0.05 to 0.5% by weight, based on the total monomer amount. Preferred monomers b) are acrylic acid, methacrylic acid, itaconic acid, maleic acid, fumaric acid, acrylamide, methacrylamide, vinyl acetate, vinylsulfonic acid, 2-acrylamido-2-methylpropanesulfonic acid, and vinyltrimethoxysilane. Particular preference is given to acrylic acid, methacrylic acid, maleic acid, acrylamide, methacrylamide, acrylonitrile, and methacrylonitrile.

Based on the total amount of monomers, the copolymers P preferably contain less than 4% by weight, with particular preference from 0.1 to 3.0% by weight and, with very particular preference, from 0.2 to 2.0% by weight of monomers bearing free acid groups and/or amides of α,β-ethylenically unsaturated carboxylic acids in copolymerized form.

In addition, the copolymers P contain from 0.01 to 1.9% by weight, preferably from 0.05 to 1.5% by weight, of at least one crosslinking monomer selected from esters of acrylic acid or methacrylic acid with linear or branched $C_3$–$C_6$-alkenols, such as allyl acrylate, methallyl acrylate, 2-buten-1-yl acrylate, 3-buten-1-yl acrylate, 3-methyl-2-buten-1-yl acrylate, 3-methyl-3-buten-1-yl acrylate, 2-methyl-3-buten-2-yl acrylate, 5-hexen-1-yl acrylate, allyl methacrylate, methallyl methacrylate, 2-buten-1-yl methacrylate, 3-buten-1-yl methacrylate, 3-methyl-2-buten-1-yl methacrylate, 3-methyl-3-buten-1-yl methacrylate, 2-methyl-3-buten-2-yl methacrylate, 5-hexen-1-yl methacrylate, from esters of acrylic acid or methacrylic acid with cyclic $C_5$–$C_7$-alkenols, such as cyclohexenyl acrylate, cyclohexenyl methacrylate, methylcyclohexenyl acrylate and methylcyclohexenyl acrylate, and from esters of acrylic acid or methacrylic acid with polycyclic $C_7$- to $C_{12}$-alkenols, such as norbornenyl acrylate, tricyclodecenyl acrylate, norbornenyl methacrylate and tricyclodecenyl methacrylate. Preference is given to allyl acrylate, methallyl acrylate, tricyclodecenyl acrylate, allyl methacrylate, methallyl methacrylate and tricyclodecenyl methacrylate, particular preference to allyl acrylate and allyl methacrylate, and very particular preference to allyl methacrylate.

It is preferred to use formulations comprising a copolymer P wherein the monomers a) include at least one ester of acrylic acid with linear and branched $C_4$–$C_8$-alkanols and at least one further monomer selected from the esters of methacrylic acid with $C_1$- and linear $C_2$–$C_4$-alkanols and vinylaromatics.

Very particular preference is given to the use of formulations comprising a copolymer P wherein the monomers a) are composed essentially of n-butyl acrylate and at least one further monomer selected from methyl methacrylate, n-butyl methacrylate and styrene.

Customarily, the copolymer P has a glass transition temperature in the range from −10 to +80° C., and preferably in the range from 0 to +60° C. It should be borne in mind here that a high-quality coating is only obtained when the aqueous formulation of the film-forming copolymer P has a minimum film-forming temperature which is below the application temperature. This minimum film-forming temperature depends in turn on the glass transition temperature $T_g$ of the copolymer P (see Ullmann's Encyclopedia of Industrial Chemistry, 5th ed., Vol. A 21, 1992, p. 169). The minimum film-forming temperature can be lowered by adding what are known as external plasticizers of low volatility to the aqueous formulation, such as esters of phthalic acid, and/or highly volatile, low-boiling organic solvents, as film-forming auxiliaries.

It has proven advantageous to tailor the formulations that are employed in accordance with the invention to their specific end applications by choosing an appropriate glass transition temperature for the copolymer P. For instance, a glass transition temperature $T_g$ for the copolymers P of above 0° C., and in particular above +10° C., has been found advantageous for the coating of concrete slabs. In this embodiment of the invention it is preferred not to exceed a $T_g$ of +50° C. In the case of fiber cement slabs, which both can be coated at elevated temperature and are intended to have a high blocking resistance, on the other hand, a glass transition temperature of above +20° C., and in particular above +30° C., has been found advantageous. The glass transition temperature $T_g$ referred to here is the midpoint temperature determined in accordance with ASTM D 3418-82 by differential thermal analysis (DSC) (cf. Ullmann's Encyclopedia of Industrial Chemistry, 5th edition, Volume A 21, VCH Weinheim 1992, pp. 169 and also Zosel, Farbe und Lack 82 (1976), pp. 125–134, see also DIN 53765).

It proves useful in this context to estimate the glass transition temperature $T_g$ of the copolymer P. According to Fox (T. G. Fox, Bull. Am. Phys. Soc. (Ser. II) 1, 123 [1956] and Ullmanns Enzyklopädie der technischen Chemie, Weinheim (1980), pp. 17, 18) the glass transition temperature of copolymers with a low degree of crosslinking, at high molar masses, is given in good approximation by $$\frac{1}{T_g} = \frac{X^1}{T_g^1} + \frac{X^2}{T_g^2} + \dots \frac{X^n}{T_g^n}$$

where $X^1$, $X^2$, ..., $x^n$ are the mass fractions of the monomers 1, 2, ..., n, and $T_g^1$, $T_g^2$, ..., $T_g^n$ the glass transition temperatures of their homopolymers, in degrees Kelvin. The latter are given, for example, in Ullmann's Encyclopedia of Industrial Chemistry, VCH, Weinheim, Vol. A 21 (1992) p. 169 or in J. Brandrup, E. H. Immergut, Polymer Handbook 3rd ed., J. Wiley, New York 1989.

From what has been said above it is clear that the glass temperature $T_g$ of the copolymer P can be adjusted either by means of an appropriate principal monomer a) having a glass temperature within the desired range or by combining at least one monomer of high glass transition temperature and at least one monomer of low glass transition temperature.

In a preferred embodiment of the present invention the constituent monomers P of the polymer comprise at least one monomer whose homopolymer, for the limiting case of a very high molecular weight, has a glass transition temperature $T_g>30°$ C., examples being styrene, α-methylstyrene, methyl methacrylate, ethyl methacrylate, n- and isopropyl methacrylate, n-, iso- and tert-butyl methacrylate, and tert-butyl acrylate, and at least one monomer whose homopolymer has a glass transition temperature $T_g<20°$ C., examples being $C_1$–$C_{12}$-alkyl acrylates, vinyl Versatates, especially ethyl acrylate, n-butyl acrylate and 2-ethylhexyl acrylate. Particular preference is given to monomer combinations of monomers with $T_g>30°$ C. and monomers with $T_g<20°$ C. which comprise styrene and/or methyl methacrylate alone or together with tert-butyl acrylate, n-butyl methacrylate and/or tert-butyl methacrylate as monomers with $T_g>30°$ C. and also n-butyl acrylate and/or 2-ethylhexyl acrylate as monomers with $T_g<20°$ C. The weight ratio of monomers with $T_g>30°$ C. to monomers with $T_g<20°$ C. is usually within the range from 20:80 to 80:20 and in particular in the range from 35:65 to 65:35. Typical monomer combinations are:

styrene: n-butyl acrylate in a weight ratio of 35:65–80:20,
styrene: 2-ethylhexyl acrylate in a weight ratio of 35:65–80:20,
methyl methacrylate: n-butyl acrylate in a weight ratio of 40:60–80:20,
methyl methacrylate: 2-ethylhexyl acrylate in a weight ratio of 35:65–80:20,
and also ternary and quaternary monomer mixtures in which some of the styrene is replaced by methyl methacrylate and/or n-butyl methacrylate, or some of the n-butyl acrylate by 2-ethylhexyl acrylate, examples being:

methyl methacrylate: styrene: 2-ethylhexyl acrylate in a weight ratio of 20:20:60,
n-butyl methacrylate: styrene: 2-ethylhexyl acrylate in a weight ratio of 35:10:55,
methyl methacrylate: n-butyl methacrylate: n-butyl acrylate in a weight ratio of 30:35:35
styrene: n-butyl acrylate: 2-ethylhexyl acrylate in a weight ratio of 50:25:25 and
styrene: methyl methacrylate: n-butyl acrylate 2-ethylhexyl acrylate in a weight ratio of 20:20:30:30.

The copolymers P present in the aqueous formulations that are employed in accordance with the invention can in principle be prepared by any conceivable method for the free-radical copolymerization of ethylenically unsaturated monomers, for example, by solution, precipitation, bulk, emulsion or suspension polymerization. The free-radical aqueous emulsion polymerization of the abovementioned monomers is preferred, in the presence of at least one free-radical polymerization initiator and, if desired, one or more surface-active substances, since in this case the copolymers P are obtained in the form of an aqueous dispersion. Using other polymerization methods it may be necessary, if appropriate, to carry out subsequent conversion of the copolymers P to an aqueous dispersion (secondary dispersion).

The film-forming aqueous formulations, according to the invention, contain the copolymer P in the form of an aqueous dispersion. The particles of copolymer in this dispersion can have average sizes in the range from 50 to 1000 nm. Methods of adjusting the polymer particle size are known, for example, from EP-A-126 699, EP-A-567 881, EP-A-567 819, DE-A-31 47 008 and DE-A-42 13 967.

Suitable free-radical polymerization initiators are all those that are able to trigger a free-radical aqueous emulsion polymerization; they may be peroxides, such as alkali metal peroxodisulfates or hydrogen peroxide, or azo compounds. It is preferred to use redox initiator systems, which are composed of at least one organic reducing agent and at least one peroxide and/or hydroperoxide, for example tert-butyl hydroperoxide with a sulfur compound, such as the sodium salt of hydroxymethanesulfinic acid, sodium sulfite, sodium disulfite, sodium thiosulfate or acetone bisulfite, or hydrogen peroxide with ascorbic acid. It is also possible for this purpose to use redox initiator systems containing a small amount of a metal compound which is soluble in the polymerization medium and whose metallic component is able to exist in two or more valence states, an example being iron(II) sulfate. Likewise preferred initiators are alkali metal peroxodisulfates, such as sodium peroxodisulfate or ammonium peroxodisulfate. The amount of free-radical initiator systems employed, based on the overall amount of monomers to be polymerized, is preferably from 0.05 to 2% by weight, more preferably from 0.1 to 1% by weight.

Surface-active substances suitable for conducting the emulsion polymerization are the emulsifiers and protective colloids that are normally employed for such purposes. The surface-active substances are usually employed in amounts of up to 10% by weight, preferably from 0.5 to 5% by weight, and in particular from 1 to 4% by weight, based on the monomers to be polymerized.

Examples of suitable protective colloids are polyvinyl alcohols, starch derivatives and cellulose derivatives, or vinylpyrrolidone copolymers. A detailed description of further suitable protective colloids is given in Houben-Weyl, Methoden der organischen Chemie, Volume XIV/1, Makromolekulare Stoffe [Macromolecular Substances], Georg-Thieme-verlag, Stuttgart 1961, pp. 411–420. Suitable emulsifiers are mentioned in Houben-Weyl, Methoden der organischen Chemie, Volume XIV/1, Makromolekulare Stoffe [Macromolecular Substances], Georg-Thieme-Verlag, Stuttgart 1961, pp. 192–208. Mixtures of emulsifiers and/or protective colloids can also be used.

As surface-active substances it is preferred to use exclusively emulsifiers, whose relative molecular weights, in contradistinction to the protective colloids, are usually below 2000. They are preferably anionic or nonionic in nature. The anionic emulsifiers include alkali metal and ammonium salts of alkyl sulfates (alkyl: $C_8$–$C_{12}$), of sulfuric monoesters of ethoxylated alkanols (EO units: 2 to 50, alkyl: $C_{12}$ to $C_{18}$) and ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$). The anionic surface-active substances also include compounds of the formula I,

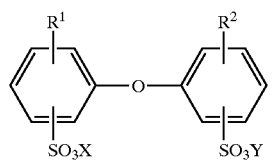
(I)

where $R^1$ and $R^2$ are hydrogen or $C_4$–$C_{24}$-alkyl but are not both hydrogen, and X and Y can be alkali metal and/or ammonium ions. The compounds I are common knowledge, for example from EP-A 469 295. Particularly advantageous compounds I are those in which X and Y are sodium, $R^1$ is a branched alkyl of 12 carbons and $R^2$ is hydrogen or is the same as $R^1$. Use is frequently made of technical-grade mixtures containing from 50 to 90% by weight of the monoalkylated product, an example being Dowfax® 2A1 (trademark of Dow Chemical Company).

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and polyethylene oxide/polypropylene oxide block copolymers.

It is preferred to employ anionic emulsifiers, especially emulsifiers of the formula I, or combinations of at least two anionic or at least one anionic with at least one nonionic emulsifier.

The molecular weight of the polymers can be adjusted by adding small amounts, generally up to 2% by weight based on the monomers to be polymerized, of one or more molecular weight regulators, examples of these being organic thio compounds, allyl alcohols and aldehydes. Using suitable regulators it is also possible to introduce groups containing silicon into the copolymer, by means, for example, of mercaptoalkyltrialkoxysilanes such as mercaptopropyltrimethoxysilane.

The emulsion polymerization can be conducted either continuously or batchwise, preferably by a semicontinuous procedure. In this case the monomers to be polymerized can be supplied continuously, including by a stepwise or gradient regime, to the polymerization batch. The monomers can be supplied to the polymerization either as a monomer mixture or else as an aqueous monomer emulsion.

Besides the seed-free preparation procedure, a defined polymer particle size can also be established by conducting the emulsion polymerization in accordance with the seed latex technique or in the presence of seed latex prepared in situ. Techniques of this kind are known and can be found in the prior art (see EP-B 40419 and Encyclopedia of Polymer Science and Technology, Vol. 5, John Wiley & Sons Inc., New York 1966, p. 847).

The pressure and temperature of polymerization are of minor importance. Polymerization is generally conducted at between room temperature and 120° C., preferably at from 40 to 110° C., and with particular preference at from 50 to 100° C.

Following the actual polymerization reaction it may be necessary to substantially free the aqueous polymer dispersions of the invention from odoriferous substances, such as residual monomers and other volatile organic constituents. This can be done, conventionally, by physical means, through distillative removal (especially by steam distillation) or by stripping with an inert gas. A reduction in the amount of residual monomers can also be achieved chemically, by free-radical postpolymerization, especially under the action of redox initiator systems, as are set out, for example, in DE-A 44 35 423, DE-A 44 19 518 and DE-A 44 35 422. Postpolymerization is preferably conducted with a redox initiator system comprising at least one organic peroxide and an organic sulfite.

In this way it is possible to obtain polymer dispersions with polymer contents of up to 80% by weight, based on the overall weight of the dispersion. For preparing the formulations employed in accordance with the invention it is preferred on practical grounds to employ dispersions having polymer contents in the range from 30 to 70% by weight, in particular from 40 to 65% by weight.

The formulations that are employed in accordance with the invention can in principle take any desired form—in other words, solvent-containing or solvent-free. The dispersion medium used preferably comprises water or mixtures of water with a water-miscible organic solvent, such as a $C_1$–$C_4$-alkanol, for instance methanol, ethanol, n- or iso-propanol, n-, iso-, 2- or tert-butanol, glycol, propylene glycol, butylene glycol, glycerol, diethylene glycol, triethylene glycol, tetrahydrofuran or the like.

The formulations used in accordance with the invention preferably include not more than 50% by weight, in particular not more than 20% by weight and specifically not more than 10% by weight, based on the overall weight of the formulation, of water-miscible solvents. With very particular preference, the formulations of the invention, in addition to water, contain no organic solvents other than customary antifreeze agents and film-forming auxiliaries.

In addition, the aqueous formulations, insofar as the copolymers P have been prepared by free-radical aqueous emulsion polymerization, also include the surface-active substances employed for this purpose, such as emulsifiers and/or protective colloids.

The solutions and dispersions of the copolymers P can be used as they are in accordance with the invention. However, the formulations generally include from 0.1 to 30% by weight of customary auxiliaries. Preferably, based on their overall weight, the formulations used in accordance with the invention contain i. from 10 to 60% by weight of at least one copolymer P and ii. from 0.1 to 20% by weight of customary auxiliaries.

Examples of customary auxiliaries are wetting agents, fungicides, defoamers, thickeners, antifreezes, leveling assistants, plasticizers and film-forming auxiliaries. Examples of suitable film-forming auxiliaries are ethylene, propylene, butylene, hexylene, diethylene, dipropylene and dibutylene glycol, their monoethers with $C_1$–$C_4$-alkanols, such as diethylene glycol monoethyl or monobutyl ether, propylene glycol monophenyl, monopropyl or monobutyl ether, dipropylene glycol monopropyl or monobutyl ether, their ether acetates, such as diethylene glycol monoethyl and monobutyl ether acetate, propylene glycol monopropyl and monobutyl ether acetate, dipropylene glycol n-butyl ether acetate, and also alkyl esters of aliphatic mono- and dicarboxylic acids, such as Texanol® from Eastman Kodak, or technical-grade mixtures thereof, such as Lusolvan FBH from BASF AG (di-n-butyl ester mixtures of succinic, glutaric and adipic acid). Suitable plasticizers are all those customary for aqueous dispersions, examples being (oligo) propylene glycol alkyl phenyl ethers as are obtainable, for instance, as Plastilit® 3060 from BASF AG.

In addition, the aqueous formulations employed in accordance with the invention may also include inorganic fillers and/or pigments. In that case the formulations used in accordance with the invention, based on their overall weight, preferably contain i. from 10 to 60% by weight of at least one polymer P,
ii. from 0.1 to 20% by weight of customary auxiliaries, and
iii. from 10 to 60% by weight of at least one finely divided filler and/or one inorganic pigment.

Examples of typical pigments are titanium dioxide, preferably in the rutile form, barium sulfate, zinc oxide or lithopones (zinc sulfide+barium sulfate). For decorative purposes the formulations may also include colored pigments, examples being iron oxides, carbon black or graphite. Suitable fillers include alumosilicates, such as feldspars, silicates, such as kaolin, talc, mica, magnesite, alkaline earth metal carbonates, such as calcium carbonate in the form, for example, of calcite or chalk, magnesium carbonate, dolomite, alkaline earth metal sulfates, such as calcium sulfate, and silica, etc.

In one preferred embodiment of the present invention the aqueous formulations are employed in the form of a clearcoat. In this case they generally include, based on their overall weight, from 10 to 60% by weight, preferably from 40 to 55% by weight of at least one copolymer P and from 0.1 to 20% by weight, preferably from 0.5 to 10% by weight, of customary auxiliaries, especially defoamers and/or film-forming auxiliaries. In particular, these aqueous formulations advantageously include a copolymer P having a glass transition temperature $T_g$ in the range from +20 to +50° C., preferably from +30 to +45° C., and have a crosslinking monomer (monomers c)) content, preferably comprising allyl methacrylate, in the range from 0.5 to 2.0% by weight, preferably in the range from 0.75 to 1.5% by weight.

In another embodiment of the present invention the aqueous formulations are employed in the form of pigmented and/or filled formulations. In this case the total content of copolymer P in the aqueous formulation is within the range from 10 to 60% by weight, preferably in the range from 20 to 40% by weight, the content of auxiliaries is within the range from 0.1 to 20% by weight and preferably within the range from 0.5 to 10% by weight, and the content of fillers and/or pigments is in the range from 10 to 60% by weight and, in particular, from 15 to 40% by weight. The amount of pigments and/or fillers is generally between 50 and 450 parts by weight per 100 parts by weight of copolymer P in the aqueous formulation. Pigment-containing formulations will also, preferably, include a dispersant and/or wetting agent in addition to the film-forming auxiliaries and defoamers. In particular, these pigmented and/or filled aqueous formulations advantageously include a copolymer P having a glass transition temperature $T_g$ in the range from +0 to +30° C., preferably from +5 to +25° C., and have a crosslinking monomer (monomers c)) content, preferably comprising allyl methacrylate, in the range from 0.05 to 0.2% by weight, preferably in the range from 0.075 to 0.15% by weight.

The present invention also relates to a method of coating shaped mineral articles which comprises applying at least one aqueous, film-forming formulation as described herein to the shaped mineral article. In general the amount of aqueous formulation to be applied (calculated in its wet form) will be from 100 to 700 g/m², corresponding to a dry add-on of from 50 to 400 g/m² and, in particular, to a dry add-on of from 100 to 300 g/m². Application can take place in a manner known per se by spraying, troweling, knife coating, rolling or pouring. The drying which generally follows can be carried out either at room temperature or at an elevated temperature in the range, for example, of from 40 to 120° C.

In one customary embodiment of the method of the invention, the shaped mineral article is provided with at least two coatings. To do this, in a first step a first aqueous film-forming formulation 1 is applied to the as yet untreated shaped mineral article, and is dried if desired, and then in a second step a further aqueous film-forming formulation 2 is applied to the shaped article provided with the first coating. Both the first and second steps can be repeated, so that in this way it is possible to obtain coatings having three or more layers.

The present invention additionally provides a method of coating shaped mineral articles in which an untreated shaped mineral article is provided with at least one first coating by applying to said shaped mineral article at least one first aqueous film-forming formulation (formulation 1) which comprises at least one copolymer P or copolymer P' composed of ethylenically unsaturated monomers, having a glass transition temperature in the range from −20 to +80° C., in dispersed form and then drying said article, repeating this procedure if desired, and subsequently applying at least one further aqueous film-forming formulation (formulation 2) comprising at least one copolymer P as described above, as topcoat, to the shaped mineral article provided with at least one first coat.

With particular preference, the film-forming component of the aqueous formulation 2 applied as topcoat is the above-defined copolymer P, preferably in the above-described embodiment for clearcoats. In contrast, the film-forming component of the first aqueous formulation 1 can be selected from the copolymers P, preferably in the above-described embodiment for pigmented and/or filled formulations, and from different polymers P'. The latter are generally likewise composed of ethylenically unsaturated monomers and are present in dispersed form in the first aqueous formulation. In accordance with the invention the polymer P', similarly to the copolymer P, will have a glass transition temperature in the range from −20 to +80° C. In one preferred embodiment of the present invention the film-forming component of the aqueous formulation 1 is a polymer P' which is different from the copolymer P.

Suitable polymers P' are all those polymers which are commonly present in aqueous formulations with a coating of shaped mineral articles. Typical polymers P' and corresponding aqueous, film-forming formulations which are suitable for the initial coating of shaped mineral articles are described, for example, in EP-A 469 295 and DE-A 195 14 266. The disclosure content of these documents is hereby fully incorporated by reference.

The constituent monomers of the polymer P' are normally selected predominantly from the abovementioned monomers a) and b), it being possible for the polymer P' to contain up to 30% by weight of monomers other than the monomers a), b) and c), in copolymerized form. In many cases, the key difference between the polymers P' and the copolymers P is that the former contain no crosslinking monomers c).

In general, from 65 to 99.9% by weight of the constituent monomers of the polymer P' are selected from vinylaromatic monomers, especially styrene and α-methylstyrene, the abovementioned esters of acrylic acid with $C_1$–$C_{12}$-alkanols, the abovementioned esters of methacrylic acid with $C_1$–$C_8$-alkanols, and the vinyl esters of aliphatic monocarboxylic acids, it being possible for up to 70% by weight of the monomers to be selected from the esters of methacrylic acid with $C_1$–$C_4$-alkanols, and/or at least 50% by weight are methyl methacrylate. Furthermore, the constituent monomers of the polymer P' generally comprise from 0.1 to 30% by weight, preferably from 0.2 to 20% by weight, and in particular from 0.5 to 5% by weight, of monomers different from these.

The polymers P' can be prepared by the methods described for the copolymers P, with preparation by means of free-radical aqueous emulsion polymerization being preferred for the polymers P' as well.

Following their preparation, the aqueous dispersions of the polymers P' and of the copolymers P are neutralized by addition of a base, such as ammonia, amines of low volatility, alkali metal hydroxides or alkaline earth metal hydroxides, or alkaline earth metal oxides. Following neutralization, the pH of the dispersions is preferably in the range from 6 to 9. It is preferred to carry out neutralization with ammonia or with alkali metal hydroxides, especially sodium hydroxide. In the case of neutralization with sodium hydroxide it has been found advantageous for the pH after neutralization to be within the range from 7.0 to 7.9. It has been found particularly advantageous if a pH of 7.9 is not exceeded during or after the addition of the alkali metal hydroxide.

In one preferred embodiment of the present invention the aqueous film-forming formulation 1 comprises, in addition to the film-forming component and the customary auxiliaries, at least one finely divided filler and/or one inorganic pigment. The amount of copolymer P and/or polymer P' in the formulation 1, based on its overall weight, is in the range from 10 to 60% by weight, preferably in the range from 20 to 40% by weight. The auxiliaries content is generally in the range from 0.1 to 20% by weight, and preferably, in the range from 0.5 to 10% by weight, and the amount of fillers and/or pigments is within the range from 10 to 60% by weight, and in particular from 15 to 50% by weight. The amount of pigments and/or fillers is generally between 50 and 450 parts by weight per 100 parts by weight of copolymer P and/or polymer P' in the aqueous formulation 1. Furthermore, in addition to the film-forming auxiliaries and the defoamers, pigmented formulations will preferably include a dispersant and/or wetting agent.

In this preferred embodiment the pigment content of the aqueous formulation 2 can be the same as the pigment content of the aqueous formulation 1. Preferably, however, it is much lower; in other words, the difference in pigment concentration is at least 10% by weight. The pigment concentration of the second formulation is in particular ≦20% by weight based on the overall weight of the formulation 2. The formulation 2 can also be used free of pigments. In this way, particularly glossy coatings are obtained.

Accordingly, the present invention additionally provides a method wherein the first aqueous film-forming formulation (formulation 1), based on its overall weight, comprises i. from 10 to 60% by weight of at least one polymer P'
ii. from 0.1 to 20% by weight of customary auxiliaries, and
iii. from 10 to 60% by weight of at least one finely divided filler and/or one inorganic pigment, and the second aqueous film-forming formulation (formulation 2), based on its overall weight, comprises i. from 10 to 60% by weight of at least one polymer P,
ii. from 0.1 to 20% by weight of customary auxiliaries, and
iii. an overall level of pigment/filler which is lower by at least 10% by weight than that of the first formulation.

In this embodiment, the formulation 1 will normally be applied in an amount from 70 to 300 $g/m^2$ (calculated on a wet basis) and the formulation 2 in an amount of from 30 to 150 $g/m^2$ to the shaped mineral article. The weight ratio of the amount of formulation 1 applied to the amount of formulation 2 applied will customarily be within the range from 4:1 to 1:1.5 and, in particular, in the range from 3:1 to 1.2:1.

The method of the invention can be applied in principle to all shaped articles comprising a mineral binder. It develops its preferential effects when applied to shaped mineral articles comprising cement as their binder (precast concrete products and fiber-reinforced cement slabs). By precast concrete products are meant shaped structures made of concrete and/or gas concrete, such as slabs, pipes and/or roof tiles. The precast concrete product is produced conventionally from ready-mixed concrete by an extrusion process. The aqueous formulations of the invention have the advantage here that they can be applied not only to a precast concrete product which has already set but also to the freshly produced and not yet set "green" product.

Drying of the green precast concrete products coated in accordance with the invention can be carried out conventionally, either at room temperature or elevated temperature. The coated green precast concrete product is preferably introduced into what is known as a chamber, where it is set in a process lasting from about 6 to 24 hours at from 40 to 70° C. and during which the copolymer of the coating composition forms a film. Following this process, the product is preferably sprayed a second time with the aqueous formulation of the invention. A second drying operation takes place in a tunnel furnace at temperatures of the circulating air of around 100° C.

Shaped mineral articles which have already set can also be coated at customary ambient temperatures, such as room temperature, with the formulations of the invention.

The advantageous properties of the aqueous formulations of the invention also apply in the case of shaped mineral articles that have been coated with a cement slurry. Such a slurry generally encompasses the customary pigments, a cement as mineral binder, customary auxiliaries and water in an appropriate amount, and is applied to the shaped mineral article, preferably a precast concrete product, which has not yet finally set. After setting, the cement slurry coat has a thickness in the range from 200 to 2000 μm. The aqueous formulations of the invention can be applied in the same way as described above.

The aqueous formulations of the invention prove to be equally advantageous when applied to fiber-reinforced concrete slabs; that is, flat, shaped mineral articles which comprise cement as binder and also mineral or organic fibers, such as polyester and/or polyamide fibers, as aggregates. The application of the aqueous formulations of the invention generally takes place as described for green precast concrete products.

The shaped mineral articles coated in accordance with the invention are notable firstly for the fact that their coating exhibits a considerably higher long-term stability on outdoor weathering. In particular, there is virtually no reduction in the gloss of the coating even after years of weathering. The adhesion of the coating to the shaped mineral articles is high both in the fresh state and after weathering. Further still, the shaped coated articles are effectively protected against efflorescence. This property is particularly significant for concrete roof tiles, which therefore constitute a preferred embodiment of the invention. In addition to this, the coatings are resistant to blocking.

Use of the aqueous formulations of the invention leads accordingly to enhanced preservation of the surface of shaped mineral articles with increased gloss stability and high long-term durability. The shaped mineral articles thus coated are novel and are likewise provided by the present invention.

The examples below illustrate the present invention.

EXAMPLES

I. Preparing the Film-forming Copolymers P and Polymers P' in the Form of Aqueous Dispersions (Dispersions ID1, CD1 and D2)

1. Preparation Procedure ID1) (Inventive)

A polymerization vessel was charged with 700.0 g of deionized water and 43.3 g of emulsifier solution 1 and this initial charge was heated to 95° C.

In a feed vessel 1 an emulsion was prepared from 602.5 g of deionized water 11.6 g of emulsifier solution 2

546.0 g of n-butyl acrylate 754.0 g of methyl methacrylate 19.5 g of acrylic acid 23.4 g of a 20% strength aqueous solution of acrylamide 13.0 g of allyl methacrylate.

In a second feed vessel 2 a solution was prepared from 3.9 g of sodium persulfate in 200.0 g of water. Subsequently, still at 95° C., 100 g of feed stream 1 and 20.4 g of feed stream 2 were added in succession in one portion to the initial charge, and reaction was allowed to take place for 12 minutes. This was followed by the addition to the polymerization vessel, beginning concurrently and by way of spatially separate feed ports, of the remaining amounts of feed stream 1 and of feed stream 2, added over the course of 3 h, while retaining the 95° C. Following the end of addition of feed stream 2 postpolymerization was allowed to take place for 30 minutes and then the batch was cooled to 25° C. and neutralized with aqueous sodium hydroxide solution (pH≈7.5).

The solids content of the resulting dispersion was 45% by weight. The glass transition temperature, determined by DSC, was 38° C.

Emulsifier solution 1: 45% strength by weight aqueous solution of an active substance available commercially as Dowfax® 2A1 (Dow Chemical) (mixture of mono- and bisdodecyl compound of the formula I as sodium salt).

2. Preparation Procedure for CD1 (Non-inventive (Co) polymer P')

A polymerization vessel was charged with 700.0 g of deionized water and 43.3 g of emulsifier solution 1 and this initial charge was heated to 95° C.

In a feed vessel 1 an emulsion was prepared from 602.5 g of deionized water 11.6 g of emulsifier solution 2

546.0 g of n-butyl acrylate 754.0 g of methyl methacrylate 19.5 g of acrylic acid 23.4 g of a 20% strength aqueous solution of acrylamide.

In a second feed vessel 2 a solution was prepared of 3.9 g of sodium persulfate in 200.0 g of water. Then, still at 95° C., 100 g of feed stream 1 and 20.4 g of feed stream 2 were added in one portion to the polymerization vessel and left to react for 12 minutes. Then, beginning concurrently and by way of spatially separate feed ports, the remainders of feed stream 1 and of feed stream 2 were added over the course of 3 h while retaining the 95° C. After the end of addition of feed stream 2 postpolymerization was allowed to take place for 30 minutes and then the batch was cooled to 25° C. and neutralized with aqueous sodium hydroxide solution (pH≈7.5).

The dispersion had a solids content of 45% by weight. The glass transition temperature, determined by DSC, was 36° C. Emulsifier Solution 1: 45% strength by weight aqueous solution of an active substance available commercially as Dowfax® 2A1 (Dow Chemical) (mixture of mono- and bisdodecyl compound of the formula I as sodium salt).

3. Preparation Procedure for D1 (Polymer P')

A polymerization vessel was charged with 400 g of deionized water and 6.22 g of emulsifier solution 1 and this initial charge was heated to 85° C.

In a feed vessel 1 an emulsion was prepared from 200.0 g of deionized water 37.3 g of emulsifier solution 1

9.3 g of emulsifier solution 2

413.0 g of methyl methacrylate 287.0 g of n-butyl acrylate 14.0 g of acrylic acid 7.0 g of a 50% strength aqueous solution of acrylamide.

In a second feed vessel 2 a solution was prepared of 1.4 g of sodium peroxodisulfate in 75 g of water.

Then, still at 85° C., 49 g of feed stream 1 and 7.6 g of feed stream 2 were added in one portion to the polymerization vessel and left to react for 30 minutes.

Then, beginning concurrently and by way of spatially separate feed ports, the remainders of feed stream 1 over the course of 3 h and of feed stream 2 over the course of 3.5 h were added while retaining the 85° C. After the end of addition of feed stream 2 postpolymerization was allowed to take place for 1 h and then the batch was cooled to 25° C. and neutralized with aqueous sodium hydroxide solution (pH≈8).

The dispersion had a solids content of about 49% by weight. Glass transition temperature (DSC) 38° C.

Emulsifier Solution 2: 45% strength by weight aqueous solution of an active substance available commercially as Dowfax® 2A1 (Dow Chemical) (mixture of mono- and di-$C_1$–$C_{12}$-alkyl compound of the formula I as sodium salt).

Emulsifier Solution 1: 15% strength by weight aqueous solution of the sodium salt of a $C_{12}$-alkyl sulfate 4. Preparation Procedure D2 (Polymer P')

D2 was prepared as for D1 except that all of the methyl methacrylate was replaced by styrene. Solids content 49% by weight; glass transition temperature 40° C. (DSC).

II. Producing Coated Shaped Mineral Articles 100 g of each of the dispersions ID1, CD1, D1 and D2 were admixed with 0.5 g of a defoamer (Tego Foamex® 825 from Th. Goldschmidt AG) and 5 g of a technical-grade mixture of the di-n-butyl esters of succinic, glutaric and adipic acid, and so were formulated to give the dispersions IDK1, CDK1, DK1 and DK2.

IIa. Producing a Clearcoated Shaped Mineral Article

The formulated dispersions IDK1 and CDK1 were applied using a spray gun to a green precast concrete product*) (add-on about 250 g/m², so-called wet application). The product was subsequently dried for 2 h at 40° C. and 75% relative atmospheric humidity and then 4 h at 40° C. and 95% relative atmospheric humidity.

*) The green precast concrete product used was a domed slab with a base area of 30×20 cm and a thickness of 1.8 cm which was produced by extruding a mortar of sand (grain size up to 0.3 mm) and cement (sand:cement weight ratio 4:1) and water (water:cement weight ratio 1:2.5). The apex of the dome was about 4 cm above the plane of the base area.

IIb. Producing a Doubly Coated Shaped Mineral Article

The formulated dispersions IDK1, CDK1, DK1 and DK2 were used to formulate in turn emulsion paints IDF1, CDF1, DF1 and DF2.

Preparing the emulsion paint DF1 with a PVC of 27:

For this purpose, 253.0 g of a commercially customary filler (calcium carbonate/calcium silicate) and 38.8 g of red iron oxide pigment from BAYER AG were suspended in 112.0 g of water. 598.0 g of the formulated dispersion DK1 were added to this suspension with stirring. This gave a paint DF1 having a PVC (pigment volume concentration) of 27.

Using the same method, the formulated dispersion DK2 was used to prepare a paint DF2 having a PVC of 40 (372 g of filler, 57 g of red iron oxide pigment, 164 g of water and 408 g of dispersion D2).

Using the same method, the formulated dispersions IDK1 and CDK1 was used to prepare a paint IDF2 and a paint CDF1, respectively, each having a PVC of 10 (104 g of filler, 16 g of pigment, 46 g of water and 835 g of dispersion).

Prior to their performance testing, the resultant paints DF1, DF2, IDF1, CDF1 were allowed to age at room temperature for 48 h. The paint was then applied using a spray gun to a green precast concrete product (see IIa) (add-on about 320 g/m², based on the paint add-on; so-called wet add-on). The product was subsequently dried for 2 h at 40° C. and 75% relative atmospheric humidity and then for 4 h at 40° C. and 95% relative atmospheric humidity. It was then coated in the same way with a second coating of the formulated dispersions IDK1 or CDK1 or of the paints IDF1 or CDF1 respectively (about 160 g/m², based on the paint) and was dried for 8 h at 40° C. and 50% relative atmospheric humidity (so-called dry add-on).

III. Determining the Performance Properties

1) Determining the gloss of a concrete slab under simulated wet weathering.

To do this, a slab produced as in II was placed for 7 d face down on a 60° C. water bath. The degree of efflorescence was assessed visually on the basis of the following scale of ratings. The results are compiled in Table 1.

0=very high gloss
1=high gloss
2=moderate gloss
3=low gloss
4=weak gloss to matt
5=matt, dull 2) Determining the gloss of a concrete slab under outdoor weathering.

To do this, a slab produced as in II was placed at an inclination of 45° on an outdoor weathering stand at Ludwigshafen am Rhein, Germany, with the coated side facing south. The gloss of the coating was assessed visually after three years on the basis of the following scale of ratings. The results are compiled in Table 1.

0=very high gloss
1=high gloss
2=moderate gloss
3=low gloss
4=weak gloss to matt
5=matt, dull

TABLE 1

Results of the examples: inventive examples B1 to B6 and comparative examples CB1 to CB6

|     | First application (wet side) [PVC] | Second application (dry side) [PVC] | Gloss under wet weathering | Gloss under outdoor weathering |
| --- | --- | --- | --- | --- |
| B1  | IDK1 [0]  | —         | 1 | 3 |
| CB1 | CDK1 [0]  | —         | 1 | 5 |
| B2  | IDF1 [10] | —         | 3 | 3 |
| CB2 | CDF1 [10] | —         | 3 | 5 |
| B3  | DF1 [27]  | IDK1 [0]  | 1 | 3 |
| CB3 | DF1 [27]  | CDK1 [0]  | 1 | 5 |
| B4  | DF1 [27]  | IDF1 [0]  | 3 | 3 |
| CB4 | DF1 [27]  | CDF1 [10] | 3 | 5 |
| B5  | DF2 [40]  | IDK1 [0]  | 1 | 3 |
| CB5 | DF2 [40]  | CDK1 [0]  | 1 | 5 |
| B6  | DF2 [40]  | IDF1 [10] | 3 | 3 |
| CB6 | DF2 [40]  | CDF1 [10] | 3 | 5 |

In addition, the formulations used in accordance with the invention feature good preservation properties (protection against efflorescence) and good adhesion properties, both to shaped mineral articles and to formulations applied previously.

We claim:

1. A method comprising coating shaped mineral articles with an aqueous film-forming formulation comprising in dispersed form at least one copolymer P composed of ethylenically unsaturated monomers, said copolymer P comprising in copolymerized form a) from 80 to 99.89% by weight of at least one ester of acrylic acid with linear and branched $C_4$–$C_8$-alkanols and at least one further monomer selected from the group consisting of esters of methacrylic acid with $C_1$- and linear $C_2$–$C_4$-alkanols and vinylaromatic compounds, b) from 0.1 to 19.99% by weight of at least one monomer different from a), selected from the group consisting of α,β-ethylenically unsaturated $C_3$–$C_6$ monocarboxylic and dicarboxylic acids, the amides, N-alkylamides and nitriles of these carboxylic acids, monoesters of α,β-monoethylenically unsaturated $C_4$–$C_8$ dicarboxylic acids with $C_1$–$C_{12}$-alkanols, vinyl esters of aliphatic $C_1$–$C_{18}$ carboxylic acids, α,β-monoethylenically unsaturated sulfonic acids and sulfonic esters, and α,β-monoethylenically unsaturated siloxanes, and c) from 0.01 to 1.9% by weight of at least one crosslinking monomer selected from the group consisting of esters of acrylic or methacrylic acid with linear or branched $C_3$–$C_6$-alkenols, cyclic $C_5$–$C_7$-alkenols and polycyclic $C_7$- to $C_{12}$-alkenols, the total content of monomers bearing free acid groups, based on the total amount of all copolymerized monomers, being less than 5% by weight.

2. The method as claimed in claim 1, wherein the crosslinking monomer c) is selected from the group consisting of allyl acrylate, methallyl acrylate, allyl methacrylate and methallyl methacrylate and mixtures thereof.

3. The method as claimed in claim 1, wherein the monomer b) is selected from the group consisting of acrylic acid, methacrylic acid, maleic acid, acrylamide, methacrylamide, acrylonitrile and methacrylonitrile and mixtures thereof.

4. The method as claimed in claim 1, wherein the film-forming aqueous formulation comprises, based on its overall weight i. from 10 to 60% by weight of at least one copolymer P, and ii. from 0.1 to 20% by weight of customary auxiliaries.

5. The method as claimed in claim 1, wherein the film-forming aqueous formulation comprises, based on its overall weight i. from 10 to 60% by weight of at least one copolymer P, ii. from 0.1 to 20% by weight of customary auxiliaries, iii. from 10 to 60% by weight of at least one finely divided filler and/or one inorganic pigment.

6. A method of coating a shaped mineral article, which comprises applying at least one aqueous film-forming formulation (A) to the shaped article, wherein an untreated mineral article is provided with at least one first coating by applying to said shaped mineral article at least one first aqueous film-forming formulation which comprises in dispersed form at least one copolymer P or a copolymer P' composed of ethylenically unsaturated monomers, having a glass transition temperature in the range from −20 to +80° C., and then drying the coated article, repeating this procedure if desired and subsequently applying at least one further aqueous film-forming formulation (A) as a topcoat to the shaped mineral article provided with at least one first coat, wherein said aqueous film-forming formulation (A) comprises in dispersed form at least one copolymer P composed of ethylenically unsaturated monomers, said copolymer P comprising in copolymerized form a) from 80 to 99.89% by weight of at least one monomer selected from the group consisting of esters of acrylic acid with $C_1$–$C_{12}$-alkanols, esters of methacrylic acid with $C_1$–$C_8$-alkanols and monovinylaromatics, b) from 0.1 to 19.99% by weight of at least one monomer different from a), selected from the group consisting of $\alpha,\beta$-ethylenically unsaturated $C_3$–$C_6$ monocarboxylic and dicarboxylic acids, the amides, N-alkylamides and nitriles of these carboxylic acids, monoesters of $\alpha,\beta$-monoethylenically unsaturated $C_4$–$C_8$ dicarboxylic acids with $C_1$–$C_{12}$-alkanols, vinyl esters of aliphatic $C_1$–$C_{18}$ carboxylic acids, $\alpha,\beta$-monoethylenically unsaturated sulfonic acids and sulfonic esters, and $\alpha,\beta$-monoethylenically unsaturated siloxanes, and c) from 0.01 to 1.9% by weight of at least one crosslinking monomer selected from the group consisting of esters of acrylic or methacrylic acid with linear or branched $C_3$–$C_6$-alkenols, cyclic $C_5$–$C_7$-alkenols and polycyclic $C_7$- to $C_{12}$-alkenols, the total content of monomers bearing free acid groups, based on the total amount of all copolymerized monomers, being less than 5% by weight.

7. A method as claimed in claim 6, wherein the first film-forming aqueous formulation comprises, based on its overall weight i. from 10 to 60% by weight of at least one copolymer P', ii. from 0.1 to 20% by weight of customary auxiliaries, and iii. from 10 to 60% by weight of at least one finely-divided filler and/or one inorganic pigment and the film-forming aqueous formulation (A) comprises, based on its overall weight i. from 10 to 60% by weight of at least one copolymer P, ii. from 0.1 to 20% by weight of customary auxiliaries and iii. has an overall pigment/filler content which is lower by at least 10% by weight than that of the first formulation.

8. A coated shaped mineral article obtained by the method as claimed in claim 1.

9. Aqueous film-forming formulation comprising in dispersed form at least one copolymer P composed of ethylenically unsaturated monomers, said copolymer P comprising in copolymerized form a) from 80 to 99.89% by weight of at least one ester of acrylic acid with linear and branched $C_4$–$C_8$-alkanols and at least one further monomer selected from the group consisting of esters of methacrylic acid with $C_1$- and linear $C_2$–$C_4$-alkanols and vinylaromatic compounds, b) from 0.1 to 19.99% by weight of at least one monomer different from a), selected from the group consisting of $\alpha,\beta$-ethylenically unsaturated $C_3$–$C_6$ monocarboxylic and dicarboxylic acids, the amides, N-alkylamides and nitriles of these carboxylic acids, monoesters of $\alpha,\beta$-monoethylenically unsaturated $C_4$–$C_8$ dicarboxylic acids with $C_1$–$C_{12}$-alkanols, vinyl esters of aliphatic $C_1$–$C_{18}$ carboxylic acids, $\alpha,\beta$-monoethylenically unsaturated sulfonic acids and sulfonic esters, and $\alpha,\beta$-monoethylenically unsaturated siloxanes, and c) from 0.01 to 1.9% by weight of at least one crosslinking monomer selected from the group consisting of esters of acrylic or methacrylic acid with linear or branched $C_3$–$C_6$-alkenols, cyclic $C_5$–$C_7$-alkenols and polycyclic $C_7$- to $C_{12}$-alkenols, the total content of monomers bearing free acid groups, based on the total amount of all copolymerized monomers, being less than 5% by weight.

* * * * *

UNITED STATES PATENT AND TRADEMARK OFFICE
CERTIFICATE OF CORRECTION

PATENT NO.    : 6,500,492 B1                                           Page 1 of 1
DATED         : December 31, 2002
INVENTOR(S)   : Manfred Schwartz et al.

It is certified that error appears in the above-identified patent and that said Letters Patent is hereby corrected as shown below:

Title page,
Item [57], ABSTRACT,
Line 15, "polycyclic $C_2$—$C_{12}$-alkenols." should read
-- polycyclic $C_7$—$C_{12}$-alkenols. --.

Column 17,
Line 51, "nitrites of these" should read -- nitriles of these --.

Column 18,
Line 8, "being Icss than" should read -- being less than --;
Line 41, "nitrites of these" should read -- nitriles of these --.

Signed and Sealed this

Thirtieth Day of September, 2003

JAMES E. ROGAN
*Director of the United States Patent and Trademark Office*